| (12) | United States Patent | (10) Patent No.: | US 12,341,239 B2 |
|---|---|---|---|
| | Haubrich et al. | (45) Date of Patent: | Jun. 24, 2025 |

(54) ANTENNA DESIGNS WITH SWITCH UNITS FOR WEARABLE DEVICES

(71) Applicant: Starkey Laboratories, Inc., Eden Prairie, MN (US)

(72) Inventors: Gregory John Haubrich, Champlin, MN (US); Paul Anders Shriner, Hopkins, MN (US); Casey Murray, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 223 days.

(21) Appl. No.: 17/823,687

(22) Filed: Aug. 31, 2022

(65) Prior Publication Data

US 2023/0178878 A1 Jun. 8, 2023

Related U.S. Application Data

(60) Provisional application No. 63/286,337, filed on Dec. 6, 2021.

(51) Int. Cl.
| *H01Q 1/27* | (2006.01) |
| *H01Q 3/24* | (2006.01) |
| *H04B 1/3827* | (2015.01) |

(52) U.S. Cl.
CPC ............. *H01Q 1/273* (2013.01); *H01Q 3/24* (2013.01); *H04B 1/385* (2013.01)

(58) Field of Classification Search
CPC ...... H01Q 1/273; H01Q 3/24; H04R 2225/51; H04R 2225/61; H04B 1/385
See application file for complete search history.

(56) References Cited

U.S. PATENT DOCUMENTS

| 5,945,951 A | 8/1999 | Monte et al. |
|---|---|---|
| 6,535,172 B2 | 3/2003 | Hirabayashi |
| 8,000,668 B2 | 8/2011 | Boguslavskij et al. |
| 9,712,925 B2 | 7/2017 | Martius et al. |
| 9,887,466 B2 | 2/2018 | Ermutlu et al. |
| 10,164,325 B1 | 12/2018 | Jan et al. |
| 10,205,227 B2 | 2/2019 | Özden |
| 10,412,481 B1 * | 9/2019 | Wu ........................ H04R 5/033 |
| 10,631,109 B2 | 4/2020 | Elghannai et al. |

(Continued)

FOREIGN PATENT DOCUMENTS

| CN | 211238504 U | 8/2020 |
|---|---|---|
| EP | 2871859 A1 | 5/2015 |

*Primary Examiner* — Dameon E Levi
*Assistant Examiner* — Leah Rosenberg
(74) *Attorney, Agent, or Firm* — Shumaker & Sieffert, P.A.

(57) ABSTRACT

An antenna system for a wearable device comprises an antenna that includes a plurality of elements. The elements include an antenna element that comprises an electrically conductive material. The antenna also includes one or more feed points configured for operable coupling to a wireless transceiver. Additionally, the antenna includes a set of one or more switch units. For each respective switch unit of the set of switch units: the respective switch unit is connected to one or more elements of the respective switch unit in the plurality of elements, a flow of electrical current to the one or more elements connected to the respective switch unit is dependent on a switch state of the respective switch unit. A radiation characteristic of the antenna is dependent on the switch states of the switch units.

16 Claims, 10 Drawing Sheets

(56) References Cited

U.S. PATENT DOCUMENTS

| | | |
|---|---|---|
| 10,735,871 B2 | 8/2020 | Webster et al. |
| 10,931,005 B2 | 2/2021 | Shriner et al. |
| 10,979,828 B2 | 4/2021 | Elghannai et al. |
| 11,012,795 B2 | 5/2021 | Elghannai et al. |
| 11,026,027 B2 | 6/2021 | Shriner et al. |
| 2017/0125891 A1* | 5/2017 | Oktar .................. H01Q 1/36 |
| 2018/0359575 A1* | 12/2018 | Thaysen ............... H01Q 1/273 |
| 2019/0098420 A1 | 3/2019 | Elgahannai et al. |
| 2021/0235206 A1 | 7/2021 | Elghannai et al. |
| 2023/0137605 A1* | 5/2023 | Wang .................. H01Q 1/273 |
| | | 455/41.2 |

\* cited by examiner

ANTENNA DESIGNS WITH SWITCH UNITS FOR WEARABLE DEVICES

This application claims the benefit of U.S. provisional patent application 63/286,337, filed Dec. 6, 2021, the entire content of which is incorporated by reference.

TECHNICAL FIELD

This disclosure relates to antennas for wearable devices.

BACKGROUND

Wearable devices are devices designed to be worn on, in, or near one or more of a user's body. Example types of wearable device may include hearing instruments, smart watches, on-body biometric sensors, media players, augmented or virtual reality headwear, and so on. Hearing instruments are wearable devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond just environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes antenna designs for wearable devices, such as hearing instruments. As described in this disclosure, an antenna for a wearable device includes a plurality of elements and a set of one or more switch units. The elements may include antenna elements and loading elements. Examples of antenna elements may include radiating elements, including driven elements and parasitic elements. Examples of loading elements may include reactive components and non-Foster circuits. For each respective switch unit of the set of switch units, the respective switch unit is connected to at least one of the antenna elements. For example, a switch unit may be connected to a single antenna element and control a flow of electrical current in the antenna element. In another example, a switch unit may be connected to a pair of antenna elements in the plurality of antenna elements. In this example, a flow of electrical current between the pair of antenna elements is dependent on a switch state of the switch unit. A radiation characteristic of the antenna is dependent on the switch states of the switch units. By changing the switch states of the antenna, and thereby changing the radiation characteristic of the antenna, the antenna may be optimized for different purposes, such as ear-to-ear communication, on-body communication, or off-body communication.

In one example, this disclosure describes an antenna system for a wearable device, wherein the antenna system comprises an antenna configured to send and receive data, the antenna comprising: a plurality of elements, wherein the elements include an antenna element that comprises an electrically conductive material; one or more feed points configured for operable coupling to a wireless transceiver; a set of one or more switch units, wherein, for each respective switch unit of the set of switch units: the respective switch unit is connected to one or more elements in the plurality of elements, a flow of electrical current to the one or more elements connected to the respective switch unit is dependent on a switch state of the respective switch unit, and wherein a radiation characteristic of the antenna is dependent on switch states of the switch units.

In another example, this disclosure describes a wearable device comprising: a housing designed for wear at an ear of a user; a wireless transceiver contained within the housing; one or more processors implemented in circuitry; and an antenna contained within the housing, the antenna comprising: a plurality of elements, wherein the elements include an antenna element that comprises an electrically conductive material; one or more feed points configured for operable coupling to the wireless transceiver; a set of one or more switch units, wherein, for each respective switch unit of the set of switch units: the respective switch unit is connected to a respective pair of elements in the plurality of antenna elements, and a flow of electrical current to the one or more elements connected to the respective switch unit is dependent on a switch state of the respective switch unit, wherein a radiation characteristic of the antenna is dependent on switch states of the switch units.

In another example, this disclosure describes a system comprising: a first wearable device and a second wearable device configured to be worn by a user, for each respective wearable device of the first wearable device and the second wearable device, the respective wearable device includes: a housing configured for wear at an ear of the user; a wireless transceiver contained within the housing; one or more processors implemented in circuitry; and an antenna contained within the housing, the antenna comprising: a plurality of elements, wherein the elements include an antenna element that comprises an electrically conductive material; one or more feed points configured for operable coupling to the wireless transceiver; a set of one or more switch units, wherein, for each respective switch unit of the set of switch units: the respective switch unit is connected to one or more elements in the plurality of elements, and a flow of electrical current to the one or more elements connected to the respective switch unit is dependent on a switch state of the respective switch unit, wherein a radiation characteristic of the antenna is dependent on switch states of the switch units.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
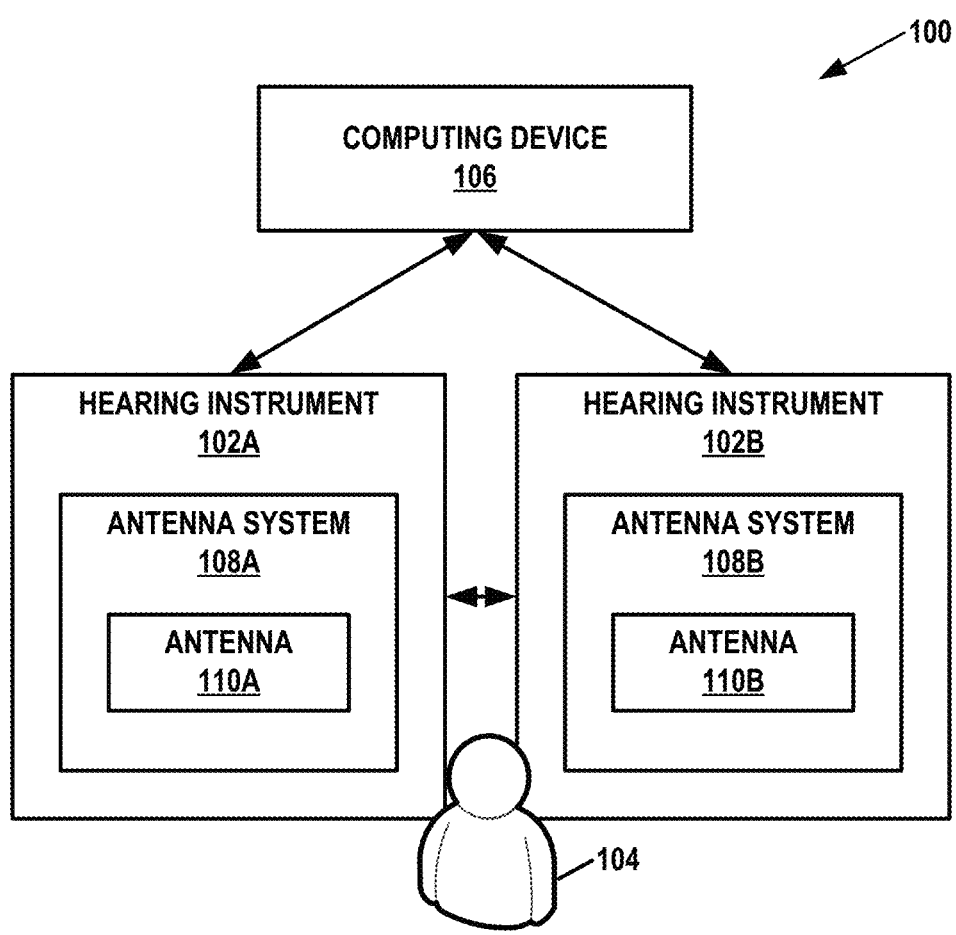
FIG. 1 is a conceptual diagram illustrating an example system that includes one or more hearing instrument(s), in accordance with one or more techniques of this disclosure.

Wireless communication links are becoming an increasingly important aspect of wearable devices, such as hearing instruments. Although much of this disclosure describes hearing instruments, the techniques of this disclosure may apply to other types of wearable devices. A hearing instrument may use wireless communication links to communicate with other hearing instruments or with other types of devices, such as mobile phones or hearing instrument accessories. Such communication may serve a wide variety of purposes, such as streaming media data and sending sensor data.

A hearing instrument requires an antenna in order to perform wireless communication. In part because of the small sizes of hearing instruments and the limited storage capacities of the batteries of hearing instruments, designing antennas for hearing instruments is challenging. For example, it may be challenging to design an antenna for a hearing instrument that has high performance for two or more of ear-to-ear communication, on-body communication, and off-body communication. Moreover, it may be impractical because of the size and cosmetic constraints of a hearing instrument for the hearing instrument to include multiple antennas for different types of wireless communication. In this disclosure, ear-to-ear communication is wireless communication between hearing instruments worn in different ears of a user. On-body communication may include wireless communication with device that are on the body of a user of the hearing instrument, such as smartphones, smartwatches, wearable devices, on-body sensor devices, and so on. Off-body communication may include wireless communication with devices other than hearing instruments that are not on the user's body, such as accessory devices, Internet of Things (IoT) devices, wireless base stations, and so on.

These different types of wireless communication may have different optimal antenna parameters. For example, an ear-to-ear wireless communication link may be best when antennas of both hearing instruments have strong radiation in certain directions with polarization perpendicular to a surface of the user's head or body in the immediate vicinities of the hearing instruments, but for off-body communication it is better to have a more omnidirectional radiation pattern. Additionally, some more challenging wireless communication links, such as a wireless communication link to a phone that is 30 meters away instead of 10 meters, may be able to be made more robust with optimized antenna parameters.

This disclosure describes techniques that may increase the performance of a hearing instrument for multiple kinds of communication, such as ear-to-ear communication, on-body communication, and off-body communication. For instance, in one example, this disclosure describes an antenna system for a hearing instrument. The antenna system comprises an antenna configured to send and receive data. The antenna itself includes a plurality of elements. The elements may include one or more antenna elements, which comprise an electrically conductive material. In some examples, the elements may also include one or more loading elements. The antenna may also include one or more feed points configured for operable coupling to a wireless transceiver. Additionally, the antenna includes a set of one or more switch units. The switch units may be loading elements. For each respective switch unit of the set of switch units, the respective switch unit is connected to one or more elements (e.g., a respective pair of antenna elements) in the plurality of elements. A flow of electrical current to the one or more elements connected to the switch unit is dependent on a switch state of the respective switch unit. In some examples, the switch state of the respective switch unit is dependent on a DC bias voltage applied to the one or more feed points. A radiation characteristic of the antenna is dependent on the switch states of the switch units. Because the radiation characteristic of the antenna is dependent on the switch states of the switch units, the antenna may be optimized for ear-to-ear communication, on-body communication, or off-body communication by controlling the switch states of the switch units. Thus, performance of the antenna for ear-to-ear communication, on-body communication, and off-body communication may be enhanced. Moreover, antennas in devices on opposite sides of the user's head or body may have the same physical structure, but the antennas may have different switch states to optimize the antennas for operation on the respective sides of the user's head or body. In other examples, the antenna may be optimized for other types of communication.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, user 104 may wear a single hearing instrument. In other instances, the user may wear two hearing instruments, with one hearing instrument for each ear of user 104.

Hearing instruments 102 may comprise one or more of various types of devices that are configured to provide auditory stimuli to user 104 and that are designed for wear and/or implantation at, on, or near an ear of user 104. Hearing instruments 102 may be worn, at least partially, in the ear canal or concha. One or more of hearing instruments 102 may include behind the ear (BTE) components that are worn behind the ears of user 104. In some examples, hearing instruments 102 comprise devices that are at least partially implanted into or integrated with the skull of user 104. In some examples, one or more of hearing instruments 102 is able to provide auditory stimuli to user 104 via a bone conduction pathway.

In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the environment of user 104, such as recorded music, computer-generated sounds, or other types of sounds. For instance, hearing instruments 102 may include so-called "hearables," earbuds, earphones, or other types of devices. Some types of hearing instruments provide auditory stimuli to user 104 corresponding to sounds from the environment of user 104 and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear contains all of the electronic components of the hearing instrument, including the receiver (i.e., the speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In some examples of this disclosure, hearing instruments 102 may communicate with each other via non-wireless communication links (e.g., in addition to wireless communication links), such as via one or more cables, direct electrical contacts, and so on.

As shown in the example of FIG. 1, system 100 may also include a computing device 106. In other examples, system 100 does not include computing device 106. Computing device 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices (not shown in FIG. 1) may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. One or more of hearing instruments 102 may communicate with computing device 106 using wireless or non-wireless communication links. For instance, hearing instruments 102 may communicate with computing device 106 and/or each other using any of the example types of communication technologies described elsewhere in this disclosure. For example, hearing instruments 102 may communicate with computing device 106 and/or each other using antennas conforming to the antenna designs described in this disclosure.

In the example of FIG. 1, hearing instrument 102A includes an antenna system 108A and hearing instrument 102B includes an antenna system 108B. This disclosure may refer to antenna system 108A and antenna system 108B collectively as "antenna systems 108." Antenna system 108A includes an antenna 110A. Similarly, antenna system 108B includes an antenna 110B. This disclosure may refer to antenna 110A and antenna 110B collectively as "antennas 110."

As described herein, one or more of antennas 110 may include a plurality of elements. The elements may include one or more antenna elements. An antenna element is an element with an independent radiating mechanism that serves as an antenna in conjunction with 0 or more other antenna elements. In some examples, an antenna element is a conductive and radiative (or significantly affecting antenna performance) portion of an antenna system. In some examples, the antenna elements may include one or more parasitic elements. Each of the antenna elements comprises an electrically conductive material. Examples of electrically conductive material may include copper, copper, gold, silver, nickel, or combinations/plating of various combinations of these or other conductive metals with the potential form-factors of wire, conformal conductive surfaces, strips, patches, or other materials. In some examples, one or more of the antenna elements may be chip antennas. The antenna may also include one or more feed points configured for operable coupling to a wireless transceiver. The elements of the one or more antennas 110 may also include one or more antenna loading elements. An antenna loading element of an antenna modifies the performance of one or more of the antenna elements of the antenna. Examples of antenna loading elements may include non-Foster circuits and reactive elements.

In accordance with one or more techniques of this disclosure, the antenna may also include a set of one or more switch units. In some examples, one or more of the switch units are PIN diodes. For each respective switch unit of the set of switch units, the respective switch unit is connected to a respective pair of antenna elements in the plurality of antenna elements. A flow of electrical current between the respective pair of antenna elements is dependent on a switch state of the respective switch unit. The switch state of the respective switch unit may be dependent on a DC bias voltage applied to the one or more feed points.

A radiation characteristic of the antenna is dependent on the switch states of the switch units. For example, a polarization, output power, radiation pattern, radiation directionality, or other characteristic of the radiation of the antenna may be dependent on the switch state pattern of the switch units. Thus, in one example, the same antenna may be able to achieve a diversity of polarization patterns. In some examples, different switch patterns may optimize the antenna for different operating bandwidths. In some examples, different switch patterns may optimize the antenna for different radiation directionality.

In some examples, control lines may be used to control the switch states of the switch units of antennas 110. Such control lines may be connected to a digital signal processor (DSP), to a wireless transceiver, or to another component of hearing instruments 102. In examples where the control lines are connected to the wireless transceiver, changes to the switch state pattern can be done on a per-connection basis.

Being able to change the radiation characteristics of antennas 110 may enable a variety of use cases. For example, processors of hearing instruments 102 may be configured to change the switch states of the switch units between switch state patterns optimized for two or more of: ear-to-ear communication, on-body communication, and off-body communication. A switch state pattern of switch units is a pattern of switch states of the switch units. For example, if an antenna includes a first switch unit and a second switch unit, a first switch state pattern may correspond to the first switch unit being on while the second switch unit is off, a second switch state pattern may correspond to the first switch unit being off while the second switch unit is on, a third switch state pattern may correspond to both the first and second switch units being on, and a fourth switch state pattern may correspond to both the first and second switch units being off.

For instance, in some examples, user 104 may use hearing instruments 102 to listen to streaming audio. In this example, computing device 106 may generate a wirelessly signal that conforms to a wireless communication protocol. The wireless signal may contain audio data packets. In some wireless communication protocols, such as Bluetooth Classic, one of hearing instruments (e.g., hearing instrument 102A) may be paired with computing device 106 and may receive the wireless signal. In this example, hearing instrument 102A may send acknowledgement messages to computing device 106. Additionally, in this example, hearing instrument 102A may perform ear-to-ear communication to wirelessly send some or all of the audio data packets to hearing instrument 102B. Hearing instrument 102B may send acknowledgement messages to hearing instrument 102A in response to the audio data packets sent by hearing instrument 102A. While hearing instrument 102A receives and acknowledges the audio data packets sent by computing device 106, hearing instrument 102B may also receive the audio data packets. In other words, hearing instrument 102B may "eavesdrop" on the wireless communication between hearing instrument 102A and computing device 106. Thus, hearing instrument 102B could potentially use "eavesdropped" audio data packets instead of receiving the same audio data packets from hearing instrument 102A via ear-to-ear communication. However, this is not typically done because doing so may require both of hearing instruments 102 to have separate antennas that are optimized for on/off-body communication and ear-to-ear communication (e.g., because hearing instruments 102 may need ear-to-ear communication for other purposes).

The ability of hearing instruments 102 to change the radiation characteristics of antennas 110 may enable hearing instrument 102A to avoid sending audio data packets to hearing instrument 102B via ear-to-ear communication. For instance, hearing instrument 102A may continue to receive audio data packets from computing device 106 and to send acknowledgement messages to computing device 106. However, both antennas 110 may alternate between two switch state patterns optimized for on/off-body communication and ear-to-ear communication. Thus, in this example, hearing instrument 102B receives "eavesdropped" audio data packets from computing device 106 while antenna 110B is in the switch state pattern optimized for on/off-body communication. Additionally, while antennas 110A and 110B are in the switch state pattern optimized for ear-to-ear communication, hearing instrument 102B may send acknowledgement messages to hearing instrument 102A to indicate to hearing instrument 102A that hearing instrument 102B received the audio data packets. Because hearing instrument 102A is informed that hearing instrument 102B has received the audio data packets, hearing instrument 102A does not need to use ear-to-ear communication to send the audio data packets to hearing instrument 102B but hearing instruments 102 can still output synchronized sound based on the audio data packets. Avoiding the need to perform ear-to-ear communication to send audio data packets from hearing instrument 102A to hearing instrument 102B may extend the battery life of hearing instrument 102A. In some examples, battery life of hearing instrument 102A may be lengthened by allow for overall decreased average transmitter radio frequency power output because the antenna performance may be dynamically optimized for each connection of a multi-device on-body/off-body communication session. Additionally, the designs of antennas 110 may be the same in both hearing instruments 102, which may reduce complexity and cost.

Thus, in some examples, a hearing instrument (e.g., hearing instrument 102A or hearing instrument 102B) may be configured to cause a switch state pattern of the switch units of the antenna to switch between a first switch state pattern and a second switch state pattern different from the first switch state pattern. The first switch pattern relatively optimizes the antenna for receiving audio data packets from a computing device. The second switch state pattern relatively optimizes the antenna for ear-to-ear transmission with a second hearing instrument configured for wear by the user. While the switch units of the antenna have the first switch state pattern, the antenna is configured to receive audio data packets from the computing device. While the switch units of the antenna have the second switch state pattern, the antenna is configured to send or receive acknowledgement messages of one or more of the audio data packets to or from the second hearing instrument.

Figure 2:
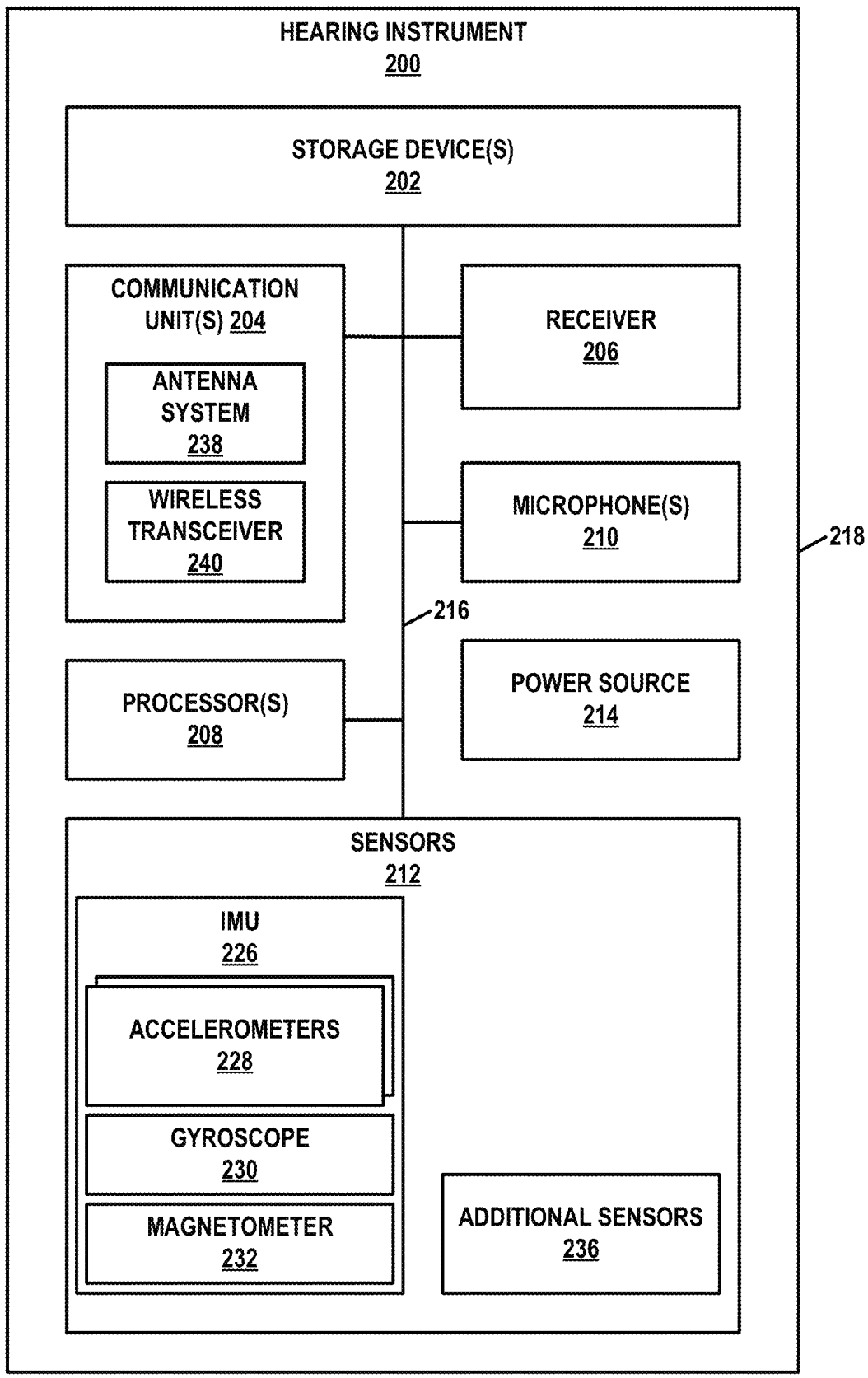
FIG. 2 is a block diagram illustrating example components of a hearing instrument, in accordance with one or more aspects of this disclosure.

FIG. 2 is a block diagram illustrating example components of hearing instrument 200, in accordance with one or more aspects of this disclosure. Hearing instrument 200 may be either one of hearing instruments 102. Each of hearing instruments 102 may include the same components as hearing instrument 200.

In the example of FIG. 2, hearing instrument 200 comprises one or more storage devices 202, one or more communication unit(s) 204, a receiver 206, one or more processor(s) 208, one or more microphone(s) 210, a set of sensors 212, a power source 214, and one or more communication channels 216. Communication channels 216 provide communication between storage devices 202, communication unit(s) 204, receiver 206, processor(s) 208, a microphone(s) 210, and sensors 212. Components 202, 204, 206, 208, 210, and 212 may draw electrical power from power source 214. In the example of FIG. 2, each of components 202, 204, 206, 208, 210, 212, 214, and 216 are contained within a single housing 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another type of device. Communication unit(s) 204 may enable hearing instrument 200 to communicate using wireless or non-wireless communication technologies. For instance, communication unit(s) 204 enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology.

As shown in the example of FIG. 2, communication unit(s) 204 include an antenna system 238 and a wireless transceiver 240. Antenna system 238 may correspond to antenna system 108A or 108B in FIG. 1. Antenna system 238 may be implemented in accordance with any of the example antenna designs described in this disclosure. Wireless transceiver 240 may comprise circuitry configured to generate modulated electrical signals sent to antenna system 238 and/or to process electrical signals received from antenna system 238.

Receiver 206 comprises one or more speakers for generating audible sound. Microphone(s) 210 detects incoming sound and generates one or more electrical signals (e.g., an analog or digital electrical signal) representing the incoming sound.

Processor(s) 208 may be processing circuits configured to perform various activities. For example, processor(s) 208 may process the signal generated by microphone(s) 210 to enhance, amplify, or cancel-out particular channels within the incoming sound. Processor(s) 208 may then cause receiver 206 to generate sound based on the processed signal. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data to computing device 106. In some examples, processor(s) 208 may cause communication unit(s) 204 to transmit data to another hearing instrument. Furthermore, communication unit(s) 204 may receive audio data from computing device 106 and processor(s) 208 may cause receiver 206 to output sound based on the audio data.

Figure 3:
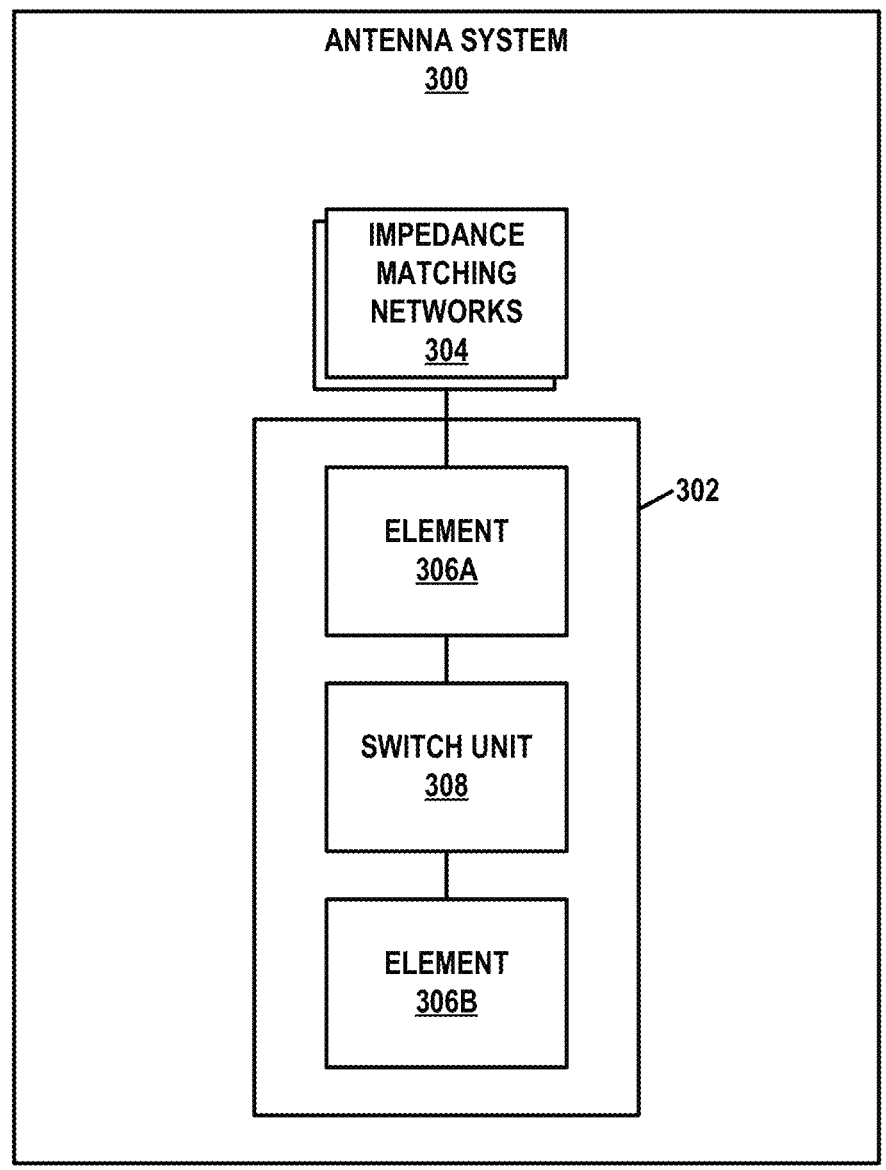
FIG. 3 is a block diagram illustrating example components of an antenna system, in accordance with one or more techniques of this disclosure.

FIG. 3 is a block diagram illustrating example components of an antenna system 300, in accordance with one or more techniques of this disclosure. Antenna system 300 may correspond to either of antenna systems 108 (FIG. 1) or antenna system 238 (FIG. 2). In the example of FIG. 3, antenna system 300 includes an antenna 302 and a set of one or more impedance matching networks 304. Antenna 302 may correspond to either of antennas 110 (FIG. 1). Antenna 302 includes a plurality of elements 306A, 306B (collectively, "elements 306"). Elements 306 may be antenna elements or loading elements. Antenna system 300 also includes a switch unit 308. In other examples, antenna 302 may include more than two elements and more than one switch unit.

In examples where elements 306 are antenna elements, antenna elements may comprise one or more electrically conductive materials. Elements 306 may serve as radiating elements of antenna 302. Elements 306 may also generate electrical signals based on electromagnetic radiation. Elements 306 may have various shapes and configurations. The arrangement of elements 306 and switch unit 308 shown in FIG. 3 is merely for conceptual purposes. Other example arrangements of elements and switch units are provided elsewhere in this disclosure.

In the example of FIG. 3, switch unit 308 connects antenna element 306A to antenna element 306B. In other words, switch unit 308 is connected to a pair of antenna elements 306A, 306B. A flow of electrical current between antenna elements 306A and 306B is dependent on a switch state of switch unit 308. For instance, switch unit 308 may cut off or otherwise attenuate the flow of electrical current between antenna element 306A and antenna element 306B. In some examples, switch unit 308 may provide a low impedance path so as not to attenuate the flow of current between antenna element 306A and antenna element 306B. The switch state of switch unit 308 may be dependent on a DC bias voltage applied to one or more feed points of antenna 302. In the example of FIG. 3, antenna 302 has a single feed point on antenna element 306A. Because the switch state of switch unit 308 may be dependent on the DC bias voltage applied to the one or more feed points of antenna 302, it may not be necessary to include additional wiring or control paths to control the switch state of switch unit 308. Avoiding the need for additional wiring or control paths to control the switch state of switch unit 308 may reduce complexity and implementation costs.

Because the impedance of antenna 302 may change when switch unit 308 has different switch states, antenna system 300 may use different instances of impedance matching networks 304 depending on the switch state of switch unit 308. Thus, in one example, a first impedance matching network of impedance matching networks 304 may be configured to be switched on for a first switch state pattern and switched off for a second switch state pattern. In this example, a second impedance matching network of impedance matching networks 304 may be configured to be switched off for the first switch state pattern and switched on for the second switch state pattern. A switch state pattern is a pattern of switch states of switch units of an antenna. The switch states of the switch units are different in the first switch state pattern than in the second switch state pattern. Thus, different impedance matching networks 304 may be switched in to optimize the power input to antenna 302.

In examples where the wireless transceiver (e.g., wireless transceiver 240 (FIG. 2)) is a dual mode radio (e.g., a radio that supports Bluetooth Low Energy and Bluetooth Classic), there may be changes in the radio impedance of the different modes. The hearing instrument may be configured to change the switch state pattern of the switch units and impendence matching networks based on the mode of the radio.

In some examples, a hearing instrument may be configured to change the switch states of one or more switch units of an antenna based on a signal characteristic of a signal received by the antenna. Example signal characteristics may include Bit Error Rate (BER) and/or a Received Signal Strength Indicator (RSSI). For example, processor(s) 208 of hearing instrument 200 may determine a BER and/or RSSI of signals received via antenna 302. In this example, processor(s) 208 may then change the switch state pattern of the switch units based on the BER and/or RSSI. For example, if the BER is above a first threshold (or the RSSI is below a second threshold), processor(s) 208 may change the switch state pattern of the switch units so that electrical current may flow to additional antenna elements. This may increase the radiation output of the antenna but may also increase draw of electrical current from power source 214. Conversely, if the BER is below a first threshold (or the RSSI is above a second threshold), which may indicate that the wireless connection is strong, processor(s) 208 may change the switch state patterns of the switch units so that electrical current flows to fewer antenna elements. This may reduce the draw of electrical current from power source 214, potentially extending battery life. Thus, in some examples, processor(s) 208 may be further configured to determine a switch state pattern of switch units based on a signal characteristic of a wireless signal received by the antenna.

In some examples, the hearing instrument may determine a signal-to-noise ratio (SNR). The hearing instrument may change the switch state pattern of the switch units of the antenna based on the SNR. In such examples, the hearing instrument may determine the signal strength (e.g., RSSI in dB) during one or more time intervals in which the hearing instrument expects to receive a signal. The hearing instrument may determine the noise (e.g., RSSI in dB) during one or more time intervals when hearing instrument does not expect to receive the signal. The hearing instrument may determine the SNR as a different between the signal and the noise RSSI.

In some examples, a hearing instrument may be configured to analyze different switch state patterns to determine an optimal switch state pattern for wireless communication with a particular device. For example, the hearing instrument may be configured to cause the switch state pattern of the switch units of the antenna to change among a plurality of switch state patterns while the antenna is in a receive interval. The hearing instrument may monitor a RSSI of the antenna in each of the switch state patterns. The hearing instrument may determine which of the switch state patterns is associated with a greatest RSSI. The hearing instrument may then use the determined switch state pattern during one or more subsequent transmit or receive intervals. The hearing instrument may repeat this process for different wireless device connections. For instance, the hearing instrument may determine a first switch state pattern for transmitting and receiving data from a first device and a second, different switch state pattern for transmitting and receiving data from a second, different device. In this way, the hearing instrument may advantageously optimize the antenna for communicating with different devices.

In some examples, the hearing instrument may be configured to cause the switch units of the antenna to have different predetermined switch state patterns for wireless communication with different types of devices. For example, the hearing instrument may be configured to cause the switch units to have a first switch state pattern for wireless communication with an off-body device and a second switch state pattern for wireless communication with an on-body device. In some such examples, a device communicating with the hearing instrument may send data to the hearing instrument indicating the type of the device so that the hearing instrument is able to adjust the switch state pattern of the switch units of the antenna for communication with the device. In some examples, the hearing instrument may use predetermined switch state patterns for wireless communication with some devices and may analyze different switch state patterns to determine an optimal switch data pattern for wireless communication with other devices.

In such examples, if the hearing instrument (e.g., hearing instrument 102A or hearing instrument 102B) is not configured to make changes to the switch states of switch units on a per-switch unit basis, the hearing instrument may use an algorithm to switch to another antenna topology.

Figure 4:
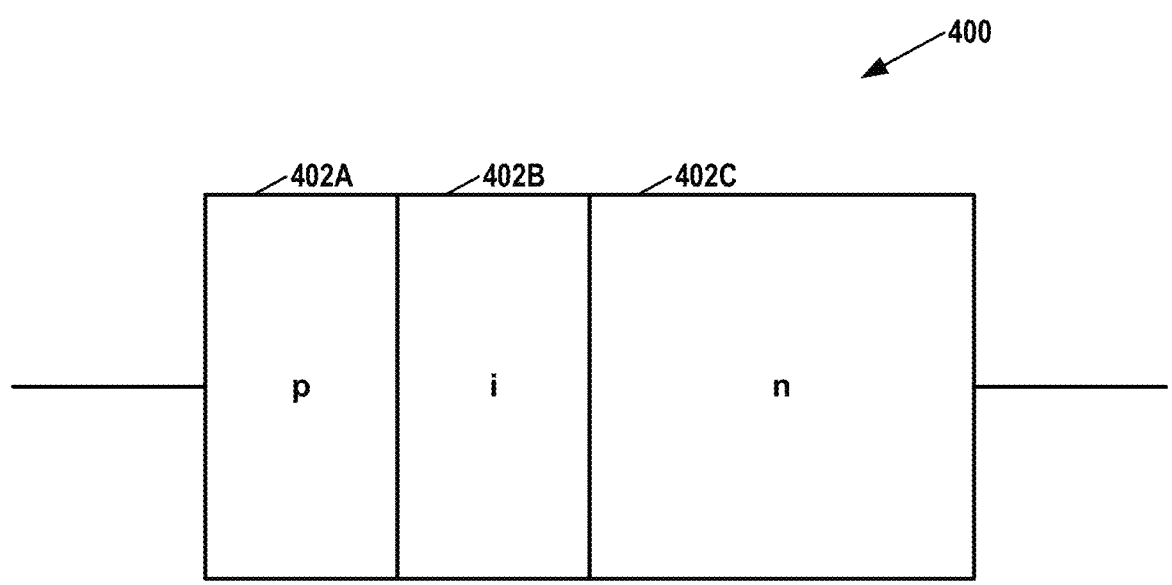
FIG. 4 is a conceptual diagram illustrating an example PIN diode.

FIG. 4 is a conceptual diagram illustrating an example PIN diode 400. As mentioned elsewhere in this disclosure, switching units (e.g., switch unit 308 (FIG. 3)) may be implemented as PIN diodes. A PIN diode includes a P node 402A, a I node 402B, and an N node 402C (collectively, "nodes 402"). P node 402A comprises a positively doped semiconductor material. I node 402B comprises an intrinsic semiconductor material. N node 402C is a negatively doped semiconductor material.

When a DC bias voltage above a positive threshold is applied to P node 402A, PIN diode 400 is forward biased and acts as a resistor, allowing high frequency current to pass through PIN diode 400 in both directions. When the DC bias voltage is not above the positive threshold (e.g., there is no positive DC bias voltage or current) at P node 402A, PIN diode 400 is reverse biased and does not conduct alternating current (AC) or radio frequency (RF) signals to pass through PIN diode 400. Moreover, a negative (reverse) DC bias voltage applied to P node 402A (i.e., no current, or only very small reverse bias leakage current) may be equivalent to OFF (i.e., PIN diode 400 does not conduct AC or RF signals. Thus, by controlling the DC bias voltage, PIN diode 400 may be used as a switch unit.

There are other ways to implement switch units at radio frequency (RF) frequencies. For example, switch units may be implemented with a pseudomorphic high electron mobility transistor (pHEMT). Use of a pHEMT as a switch unit may involve more control lines but may require less current to operate. In another example, switch units may be electromechanical components. Electromechanical components may have shorter lifetimes and may be slower to change switch states. However, electromechanical components may have lower insertion loss. In some examples, one or more switch units may be implemented as voltage-controlled capacitors. In some such examples, the voltage controlling the capacitors may be local voltage levels, e.g., instead of an overall DC bias voltage received via feed points of the antenna.

Figure 5:
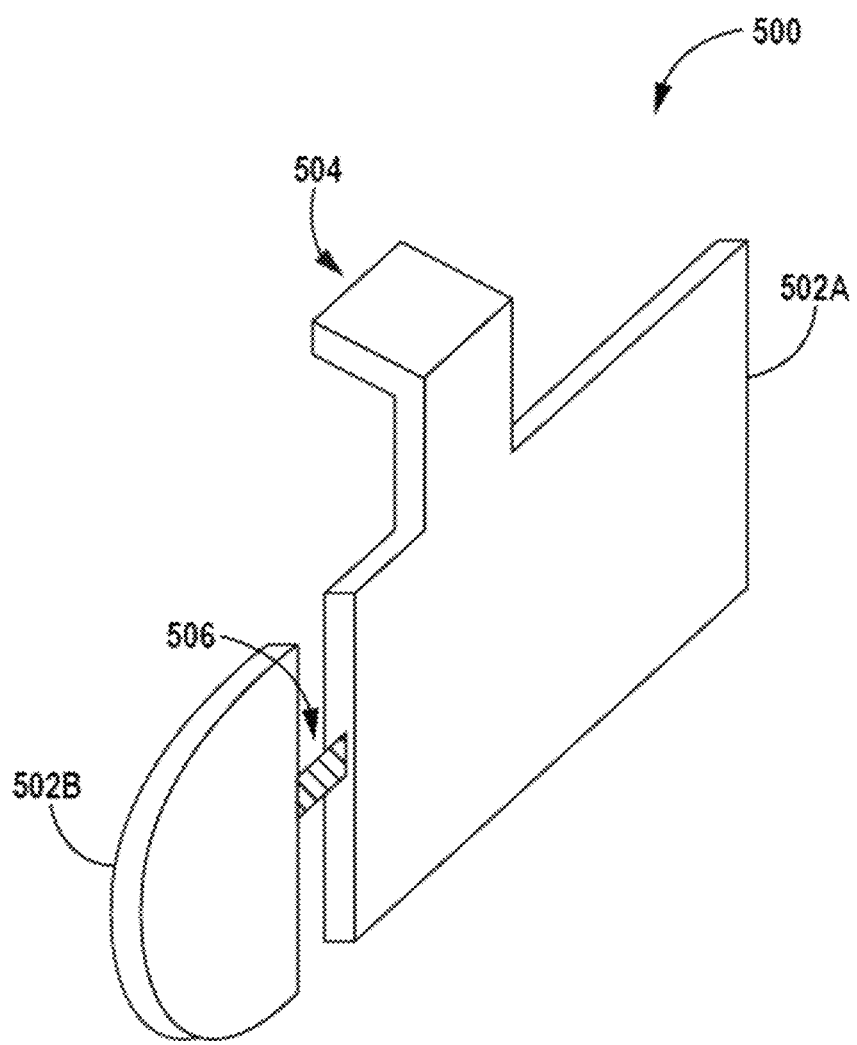
FIG. 5 is a conceptual diagram illustrating a first example antenna in accordance with one or more techniques of this disclosure.

FIG. 5 is a conceptual diagram illustrating a first example antenna 500 in accordance with one or more techniques of this disclosure. In the example of FIG. 5, antenna 500 includes antenna elements 502A, 502B (collectively, "antenna elements 502"). A feed point 504 of antenna 500 forms part of antenna element 502A. A switch unit 506 connects antenna element 502A and antenna element 502B. In the example of FIG. 5, antenna element 502A is generally rectangular in shape. Antenna element 502B is semicircular in shape.

In other examples, antenna elements may have different shapes and positions. For instance, in one example, an antenna may include one or more antenna elements positioned along a posterior of a hearing instrument that may be switched on or off depending on the switch states of one or more switch units. In some examples, the antenna elements may include arms of a multipole antenna that may be switched on or off in different switch state patterns.

Figure 6:
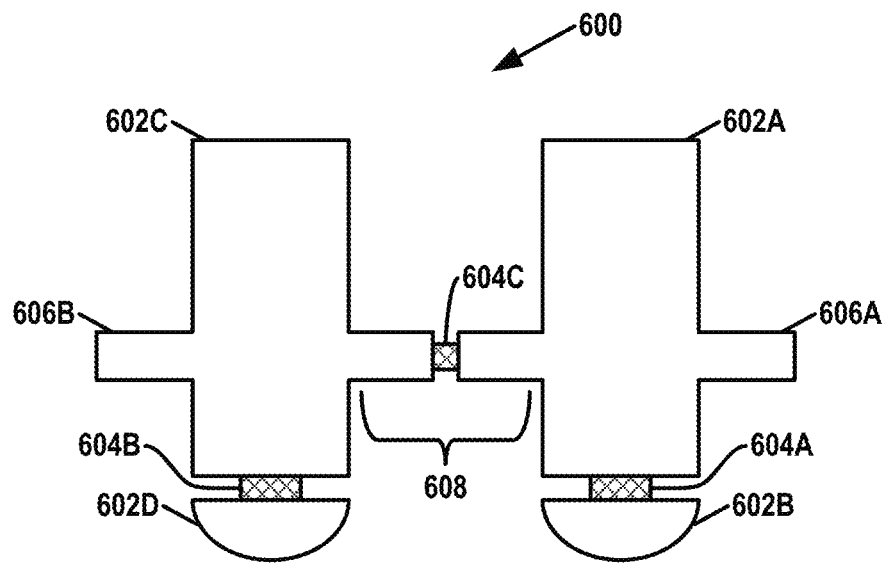
FIG. 6 is a conceptual diagram illustrating a second example antenna in accordance with one or more techniques of this disclosure.

FIG. 6 is a conceptual diagram illustrating a second example antenna 600 in accordance with one or more techniques of this disclosure. In the example of FIG. 6, antenna 600 includes antenna elements 602A, 602B, 602C, and 602D (collectively, "antenna elements 602"). Antenna 600 also includes three switch units 604A, 604B, and 604C (collectively, "switch units 604"). Switch unit 604A connects antenna elements 602A and 602B. Switch unit 604B connects antenna elements 602C and 602D. Switch unit 604C connects antenna elements 602A and 602C. Antenna 600 also includes two feed points 606A and 606B (collectively, "feed points 606"). Feed point 606A is on antenna element 602A. Feed point 606B is on antenna element 602C. Feed points 606 may be connected to a wireless transceiver (e.g., wireless transceiver 240 (FIG. 2)) via one or more impedance matching networks (e.g., impedance matching networks 304 (FIG. 3)).

Although shown as being flat in the example of FIG. 6, antenna 600 may have a 3-dimensional shape. For example, antenna 600 may be folded or otherwise arranged so that antenna elements 602A, 602B are oriented substantially in opposition to antenna elements 602C, 602D. For instance, antenna elements 602A, 602B and antenna elements 602C, 602B may be substantially parallel to one another and separated by a particular distance. For instance, antenna 600 may be included in a BTE or RIC hearing instrument and antenna elements 602A, 602B may be positioned proximate to a medial surface of the hearing instrument and antenna elements 602C, 602D may be positioned proximate to a lateral surface of the hearing instrument. Processing circuitry and/or other components of the hearing instrument may be positioned between antenna elements 602A, 602B and antenna elements 602C, 602D. In this example, parts of antenna elements 602A and 602C may form a strap element 608. Thus, in the example of FIG. 6, strap element 608 may have a first portion that is connected to antenna element 602A and a second portion that is connected to antenna element 602C. Switch units 604 includes switch unit 604C that connects the first portion of strap element 608 and the second portion of strap element 608. Strap element 608 may be positioned proximate an inferior surface of the hearing instrument. Thus, in some such examples, strap element 608 may act as a loading element that has a switch unit 604C in series. This configuration may allow for only one switch unit in strap element 608 instead of two. Because switch unit 604 may be a reverse biased PIN diode that acts as a capacitor, switch unit 604 may act as a reactive element.

Switch units 604 may be configured to have different switch states from one another. For example, in a first switch state pattern, switch units 604A, 604B may allow current flow while switch unit 604C does not allow current flow. The first switch state pattern may optimize antenna for 600 for off-body communication. In this example, in a second switch state pattern, switch units 604A, 604B, and 604C all allow current flow. The second switch state pattern may optimize antenna for 600 for ear-to-ear communication. In this example in a third switch state pattern, switch unit 604C may allow current flow while switch units 604A, 604B do not allow current flow. Other switch state patterns are possible in the example of FIG. 6. In some examples, these different switch state patterns may be possible because different ones of switch units 604 may be configured to switch current flow on or off at different DC bias voltage levels.

In some examples, it may be advantageous to have the antennas of the left and right hearing instruments of a user have different radiation characteristics. For instance, when performing ear-to-ear communication, it may be desirable for the left hearing instrument to have radiation characteristics that primarily direct wireless signals toward the right hearing instrument, and vice versa. However, implementing different physical antenna structures in the left and right hearing instruments may increase the cost and complexity of the hearing instruments. It may instead be advantageous to have the same physical antenna structure in both the left and right hearing instruments while still having different radiation characteristics for the left and right hearing instruments.

Hence, in accordance with a technique of this disclosure, the antennas in the left and right hearing instruments may have the same physical structures but the left and right hearing instruments may be configured to use different switch state patterns in the antennas of the left and right hearing instruments. By using different switch state patterns, the antennas of the left and right hearing instruments may have different radiation characteristics, which may enable optimization of the antennas for ear-to-ear communication.

For example, antenna 600 of FIG. 6 may be folded such that antenna elements 602A, 602B are substantially opposed to antenna elements 602C, 602D. Furthermore, in this example, antenna elements 602A, 602B may be positioned proximate a medial surface of a first hearing instrument worn on the left side of the user's head and antenna elements 602C, 602D may be positioned proximate a lateral surface of the first hearing instrument. In this example, counterpart antenna elements to antenna elements 602A, 602B may be positioned proximate a medial surface of a second hearing instrument worn on the right side of the user's head and counterpart antenna elements to antenna elements 602C, 602D may be positioned proximate a lateral surface of the second hearing instrument. In this example, when performing ear-to-ear communication, the switch state pattern of the antenna of the first hearing instrument may be such that electrical current flows to antenna element 602D and not antenna element 602B. However, the switch state pattern of the antenna of the second hearing instrument may be such that electrical current flows to antenna element 602B and not antenna element 602D.

Figure 7:
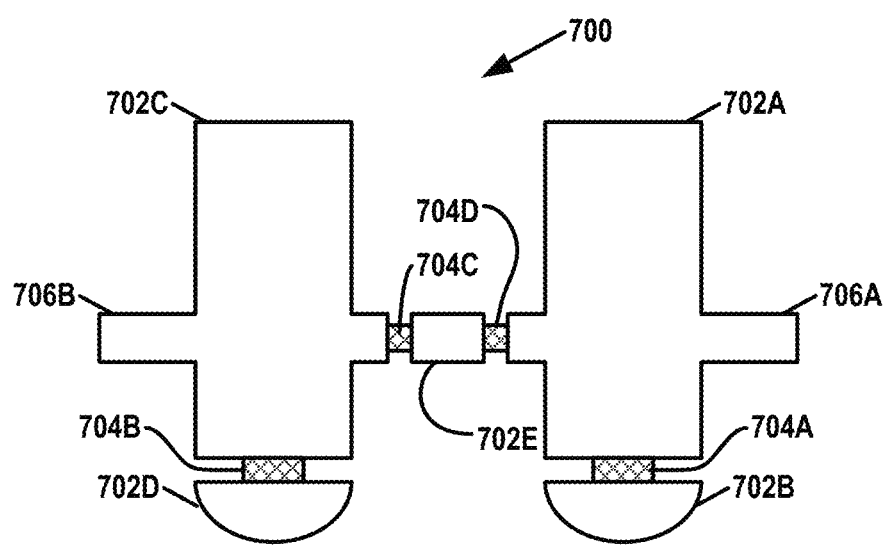
FIG. 7 is a conceptual diagram illustrating a third example antenna in accordance with one or more techniques of this disclosure.

FIG. 7 is a conceptual diagram illustrating a third example antenna 700 in accordance with one or more techniques of this disclosure. In the example of FIG. 7, antenna 700 includes antenna elements 702A, 702B, 702C, 702D, and 702E (collectively, "antenna elements 702"). Antenna 700 also includes four switch units 704A, 704B, 704C, and 704D (collectively, "switch units 704"). Switch unit 704A connects antenna elements 702A and 702B. Switch unit 704B connects antenna elements 702C and 702D. Switch unit 704C connects antenna elements 702A and 702E. Switch unit 704D connects antenna elements 702A and 702E. Antenna 700 also includes two feed points 706A and 706B (collectively, "feed points 706"). Feed point 706A is on antenna element 702A. Feed point 706B is on antenna element 702C. Feed points 706 may be connected to a wireless transceiver (e.g., wireless transceiver 240 (FIG. 2)) via one or more impedance matching networks (e.g., impedance matching networks 304 (FIG. 3)).

Although shown as being flat in the example of FIG. 7, antenna 700 may have a 3-dimensional shape. For example, antenna 700 may be arranged so that antenna elements 702A, 702B are oriented substantially in opposition to antenna elements 702C, 702D. For instance, antenna 700 may be included in a BTE or RIC hearing instrument and antenna elements 702A, 702B may be positioned proximate to a medial surface of the hearing instrument and antenna elements 702C, 702D may be positioned proximate to a lateral surface of the hearing instrument. Processing circuitry and/or other components of the hearing instrument may be positioned between antenna elements 702A, 702B and antenna elements 702C, 702D. In this example, antenna element 702E may be a strap element. Antenna element 702E may be positioned proximate an inferior surface of the hearing instrument, in which case antenna element 702E may be considered to be a "belly strap." Switch units 704 may have various switch state patterns, e.g., as described above with respect to the example of FIG. 6.

Thus, in the example of FIG. 7, antenna elements 702 include a first antenna element (e.g., antenna element 702A) and a second antenna element (e.g., antenna element 702C) oriented substantially in opposition to one another. Antenna elements 702 also include a strap element (e.g., antenna element 702E) positioned between the first antenna element and the second antenna element. The set of switch units includes a first switch unit (e.g., switch unit 704C) and a second switch unit (e.g., switch unit 704D). The first switch unit connects the first antenna element and the strap element. The second switch unit connects the second antenna element and the strap element.

In examples where antenna element 702E is a belly strap and electrical current flows through antenna element 702E, the radiation pattern generated by antenna 700 may be especially advantageous for launching creeping waves that progress along the posterior surface of the head of user 104. Thus, setting the switch state pattern of switch units 704 to allow current flow through antenna element 702E may enhance ear-to-ear communication. However, the radiation pattern generated by antenna 700 when electrical current flows through antenna element 702E may not be as advantageous for on-body communication or off-body communication. For instance, on-body communication or off-body communication may be enhanced when antenna 700 functions more as a bowtie antenna. Thus, setting the switch pattern of switch units 704 to prevent current flow through antenna element 702 may enhance on-body communication or off-body communication.

Furthermore, in some examples, activation of antenna element 702E (i.e., allowing electrical current to flow through antenna element 702E) may be advantageous for on-body communication with a device that is on the same side of the user's body as the hearing instrument that includes antenna 700. However, activation of antenna element 702E may be unnecessary or disadvantageous for on-body communication with a device that is on the opposite side of the user's body as the hearing instrument that includes antenna 700. Thus, in accordance with a technique of this disclosure, a left-side hearing instrument may be configured to activate antenna element 702E for on-body communication with a device on the left side of the user's body while a right-side hearing instrument may be configured to deactivate antenna element 702E. Conversely, the right-side hearing instrument may be configured to activate antenna element 702E for on-body communication with a device on the right side of the user's body while the left-side hearing instrument may be configured to deactivate antenna element 702E. In this way, processors 208 are further configured to determine a switch state pattern of the switch units based on which side of the user's body the computing device is located. Thus, the antennas of the left- and right-side hearing instruments may concurrently have different radiation characteristics but may have the same physical structure.

Figure 8:
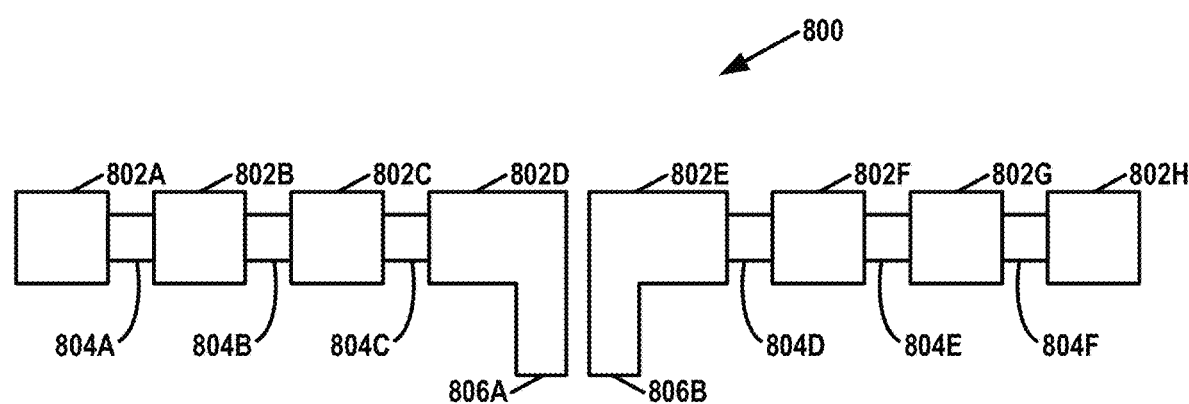
FIG. 8 is a conceptual diagram illustrating a fourth example antenna in accordance with one or more techniques of this disclosure.

FIG. 8 is a conceptual diagram illustrating a fourth example antenna 800 in accordance with one or more techniques of this disclosure. In the example of FIG. 8, antenna 800 is a dipole antenna. Antenna 800 includes elements 802A, 802B, 802C, 802D, 802E, 802F, 802G, and 802H (collectively, "elements 802"). Antenna 800 also includes switch units 804A, 804B, 804C, 804D, 804E, and 804F (collectively, "switch units 804"). In other examples, antenna 800 may include more or fewer elements and switch units. Feed points 806A, 806B of antenna 800 are included in elements 802D and 802E.

As shown in the example of FIG. 8, switch units 804 are arranged in series. Different switch units 804 may change switch states in response to different DC bias voltages. Thus, a hearing instrument may effectively change a length of antenna 800 by applying different DC bias voltages. In other examples, the hearing instrument may send signals through control lines to switch units 804 to effectively change the length of antenna 800.

Figure 9:
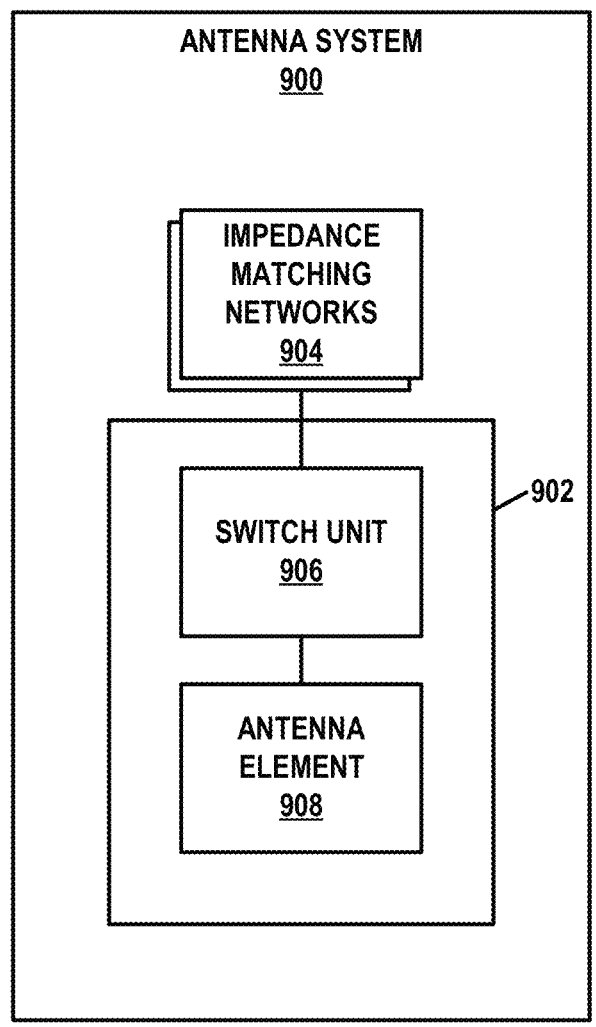
FIG. 9 is a conceptual diagram illustrating an example antenna system in accordance with one or more techniques of this disclosure.

FIG. 9 is a conceptual diagram illustrating an example antenna system 900 in accordance with one or more techniques of this disclosure. In the example of FIG. 9, antenna system 900 may include an antenna 902 and one or more impedance matching networks 904. Antenna 902 includes a switch unit 906 and antenna element 908. Impedance matching networks 904, switch unit 906, and antenna element 908 may be implemented in the same manner as impedance matching networks 304, antenna elements 306, and switch unit 308 in FIG. 3. As shown in the example of FIG. 9, switch unit controls the flow of electrical current in antenna element 908. Antenna system 900 may be advantageous in some circumstances because antenna 902 may reduce a duty cycle of antenna system 900. In other words, if the performance of antenna system 900 is improved by augmentation of antenna 902, then some of the redundancy needed to repeat unreceived packets in Bluetooth for example, may not be required. This may decrease the receive and transmit time because less resends may be performed. Hence, the duty-cycle of the active communication intervals of Bluetooth may be reduced.

Figure 10:
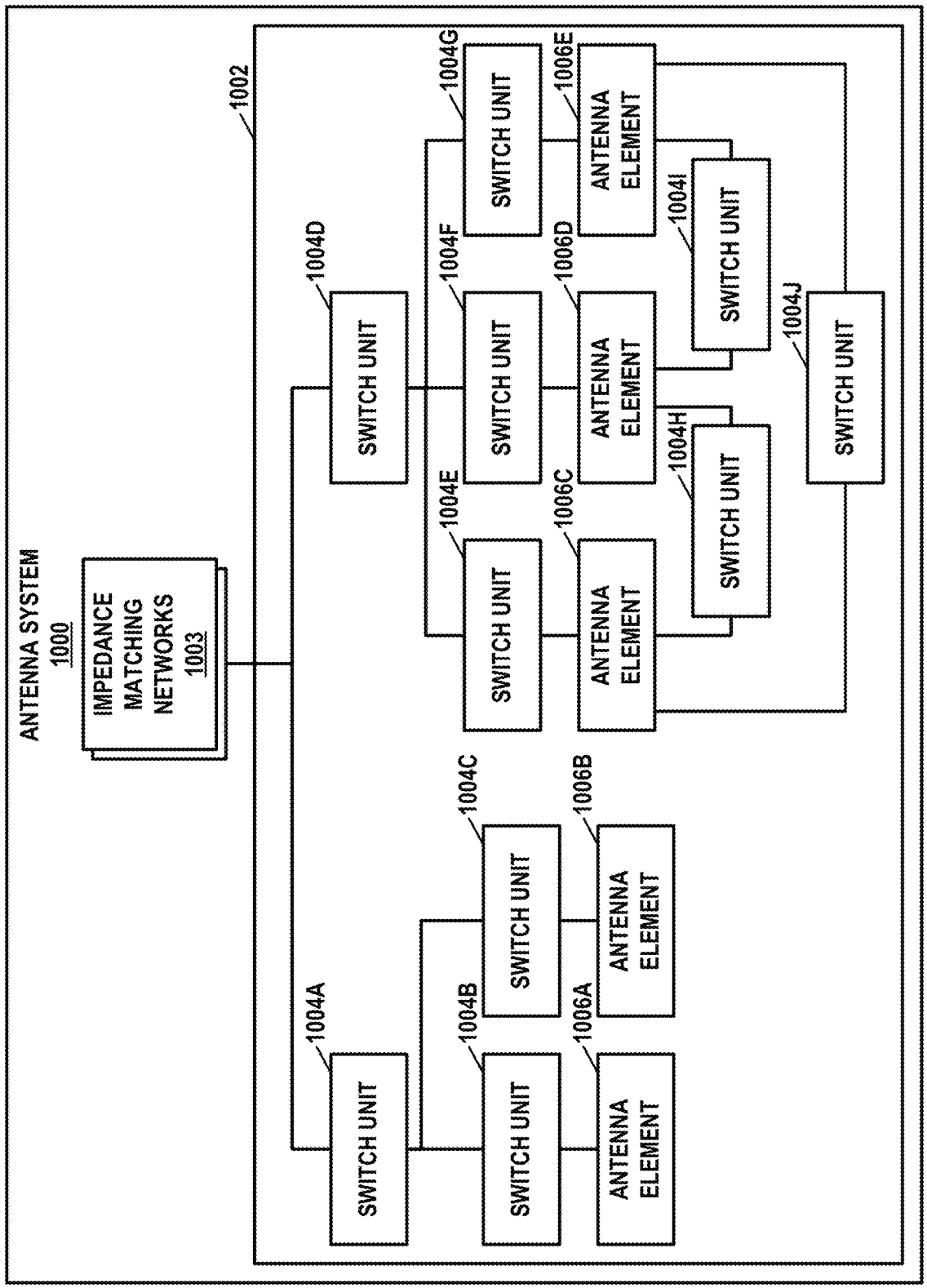
FIG. 10 is a conceptual diagram illustrating an example antenna system in accordance with one or more techniques of this disclosure.

FIG. 10 is a conceptual diagram illustrating an example antenna system 1000 in accordance with one or more techniques of this disclosure. In the example of FIG. 10, antenna system 1000 includes an antenna 1002 and one or more impedance matching networks 1003. Antenna 1002 includes switch units 1004A-1004J (collectively, "switch units 1004"), and antenna elements 1006A-1006E (collectively, "antenna elements 1006"). Impedance matching networks 1003, switch units 1004, and antenna elements 1006 may be implemented in the same way as impedance matching networks 304 of FIG. 3. The arrangement and connections of switch units 1004A, 1004B, and 1004C and antenna elements 1006A and 1006B results in antenna elements 1006A and 1006B being parallel in the context of a circuit diagram. The arrangement and connections of switch units 1004A, 1004B, and 1004C and antenna elements 1006A and 1006B provides antenna 1002 with an ability to disconnect either or both of antenna elements 1006A, 1006B.

Furthermore, in the example of FIG. 10, antenna elements 1006C, 1006D, and 1006E are parallel in the context of a circuit diagram. As shown in the example of FIG. 10, distal ends of antenna elements 1006C, 1006D, and 1006E may also be connected. A distal end of an antenna element is a side of the antenna element opposite the feed point of the antenna element.

Figure 11:
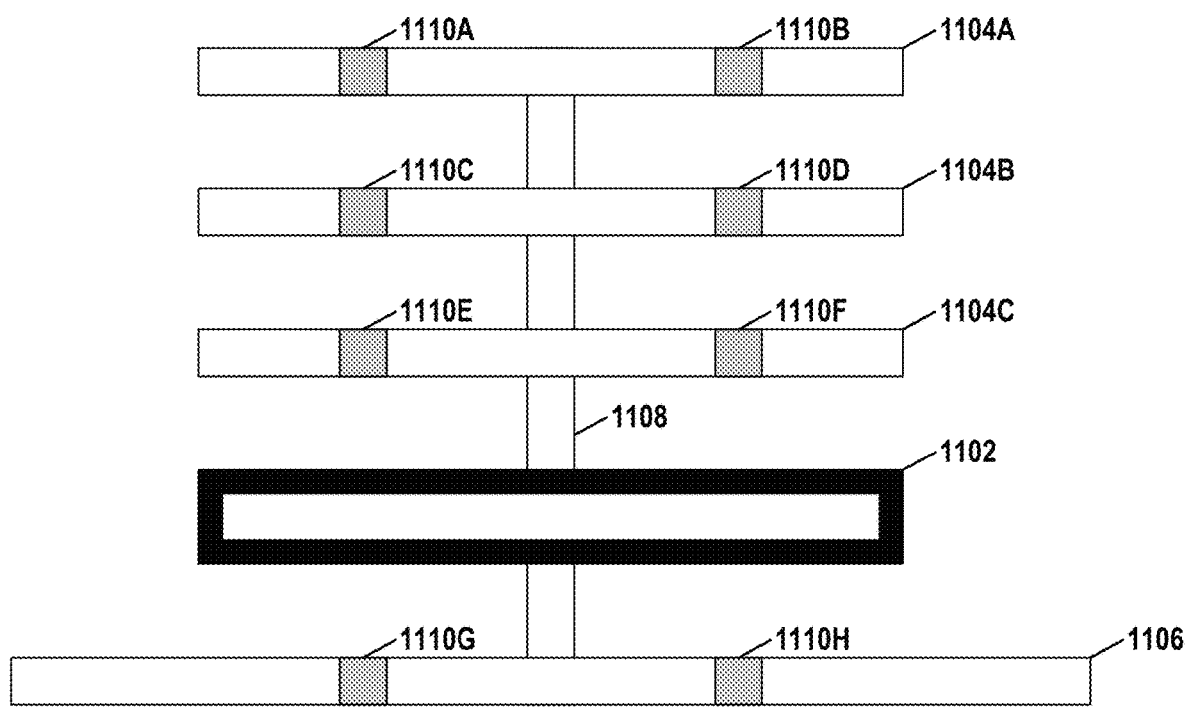
FIG. 11 is a conceptual diagram illustrating an example Yagi-Uda antenna in accordance with one or more techniques of this disclosure.

FIG. 11 is a conceptual diagram illustrating an example Yagi-Uda antenna 1100 in accordance with one or more techniques of this disclosure. Yagi-Uda antenna 1100 includes a feeder member 1102, one or more director members 1104 (shown as director members 1104A, 1104B, and 1104C in FIG. 11), and a reflector member 1106. A support member 1108 provides support for feeder member 1102, director members 1104, and reflector member 1106. Support member 1108 may electrically insulate feeder member 1102, director members 1104, and reflector member 1106 from each other. In other words, electrical current does not flow from feeder member 1102 to director members 1104 or reflector member 1106 via support member 1108.

An electrical conductor may connect feeder member 1102 to an RF transceiver (not shown) of a device (e.g., a wearable device, such as a hearing instrument). The RF transceiver may send and receive electrical current to and from feeder member 1102 via the electrical conductor. In some examples, feeder member 1102 is a dipole antenna, a folded dipole antenna, or other type of antenna.

Director members 1104 and reflector member 1106 are parasitic elements. Director members 1104 and reflector member 1106 modify the radiation pattern of feeder member 1102 in order to modify a gain of Yagi-Uda antenna 1100 in a direction aligned with support member 1108. In other words, director members 1104 and reflector member 1106 modify the directionality of the radiation pattern of feeder member 1102. The electrical lengths of director members 1104 and reflector member 1106 influence the directionality of Yagi-Uda antenna 1100.

In the example of FIG. 11, each of director members 1104 and reflector member 1106 comprise one or more switch units 1110A-1110H (collectively, "switch units 1110"). In other examples, director members 1104 or reflector member 1106 may include more or fewer switch units than shown in the example of FIG. 11. In some examples, one or more of director members 1104 or reflector member 1106 does not include any switch units. The switch states of switch units 1110 may be controlled via control lines.

By changing the switch state pattern of switch units 1110, a device (e.g., one of hearing instruments 102) may change a radiation characteristic (e.g., directionality) of Yagi-Uda antenna 1100. For example, the device may increase the directionality of Yagi-Uda antenna 1100 by configuring the switch states of switch units 1110 to allow electrical current flow. Conversely, configuring one or more of switch units 1110 to restrict electrical current flow may reduce the electrical lengths of director members 1104 and/or reflector member 1106, which may decrease the directionality of Yagi-Uda antenna 1100. In the context of hearing instruments, increasing the directionality of Yagi-Uda antenna 1100 may be advantageous for ear-to-ear communication while decreasing the directionality of Yagi-Uda antenna 1100 may be more advantageous for off-body communication.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

What is claimed is:

1. An antenna system for a wearable device, wherein the antenna system comprises an antenna configured to send and receive data, the antenna comprising:
   a plurality of elements, wherein the elements include a first antenna element, a second antenna element, and a strap element, each comprising an electrically conductive material, the first antenna element and the second antenna element are oriented substantially in opposition to one another, the strap element has a first portion that is connected to the first antenna element and a second portion that is connected to the second antenna element;
   one or more feed points configured for operable coupling to a wireless transceiver, wherein the one or more feed points include a first feed point on the first antenna element and a second feed point on the second antenna element, the first portion of the strap element is on an opposite side of the first antenna element from the first feed point, and the second portion of the strap element is on an opposite side of the second antenna element from the second feed point;
   a set of one or more switch units, wherein:
      the set of switch units includes a switch unit that connects the first portion of the strap element and the second portion of the strap element, and
      for each respective switch unit of the set of switch units:
         the respective switch unit is connected to one or more elements in the plurality of elements, and
         a flow of electrical current to the one or more elements connected to the respective switch unit is dependent on a switch state of the respective switch unit, and
   wherein a radiation characteristic of the antenna is dependent on switch states of the switch units.

2. The antenna system of claim 1, wherein one or more of the switch units are PIN diodes.

3. The antenna system of claim 1, wherein the switch state of the respective switch unit is dependent on a DC bias voltage applied to the one or more feed points.

4. The antenna system of claim 1, further comprising:
   an impedance matching network configured to be switched on for a first switch state pattern and switched off for a second switch state pattern, wherein the switch states of the switch units are different in the first switch state pattern than in the second switch state pattern.

5. The antenna system of claim 1, wherein the radiation characteristic of the antenna is a radiation directionality of the antenna.

6. A wearable device comprising:
   a housing designed for wear at an ear of a user;
   a wireless transceiver contained within the housing;
   one or more processors implemented in circuitry; and
   an antenna contained within the housing, the antenna comprising:
      a plurality of elements, wherein the elements include a first antenna element, a second antenna element, and a strap element, each comprising an electrically conductive material, the first antenna element and the second antenna element are oriented substantially in opposition to one another, the strap element has a first portion that is connected to the first antenna element and a second portion that is connected to the second antenna element;
      one or more feed points configured for operable coupling to the wireless transceiver, wherein the one or more feed points include a first feed point on the first antenna element and a second feed point on the second antenna element, the first portion of the strap element is on an opposite side of the first antenna element from the first feed point, and the second portion of the strap element is on an opposite side of the second antenna element from the second feed point;

a set of one or more switch units, wherein:
  the set of switch units includes a switch unit that connects the first portion of the strap element and the second portion of the strap element, and
  for each respective switch unit of the set of switch units:
    the respective switch unit is connected to a respective pair of elements in the plurality of elements, and
    a flow of electrical current to the one or more elements connected to the respective switch unit is dependent on a switch state of the respective switch unit, and
  wherein a radiation characteristic of the antenna is dependent on switch states of the switch units.

7. The wearable device of claim 6, wherein one or more of the switch units is a PIN diode.

8. The wearable device of claim 6, wherein the one or more processors are configured to control the switch states of the switch units by controlling a DC bias voltage applied to the one or more feed points.

9. The wearable device of claim 6, further comprising an impedance matching network,
  wherein the one or more processors are configured to switch on the impedance matching network for a first switch state pattern and switch off the impedance matching network for a second switch state pattern, wherein the switch states of the switch units are different in the first switch state pattern than in the second switch state pattern.

10. The wearable device of claim 6, wherein the one or more processors are configured to change the switch states of the switch units between switch state patterns optimized for two or more of: ear-to-ear communication, on-body communication, and off-body communication.

11. The wearable device of claim 6, wherein:
  the wearable device is a first wearable device and is configured for wear by the user,
  the one or more processors are configured to cause a switch state pattern of the switch units of the antenna to switch between a first switch state pattern and a second switch state pattern different from the first switch state pattern, wherein:
    the first switch state pattern relatively optimizes the antenna for receiving audio data packets from a computing device,
    the second switch state pattern relatively optimizes the antenna for ear-to-ear transmission with a second wearable device configured for wear by the user,
    while the switch units of the antenna have the first switch state pattern, the antenna is configured to receive the audio data packets from the computing device, and
    while the switch units of the antenna have the second switch state pattern, the antenna is configured to send or receive acknowledgement messages of one or more of the audio data packets to or from the second wearable device.

12. The wearable device of claim 6, wherein the one or more processors are further configured to determine a switch state pattern of the switch units based on a signal characteristic of a wireless signal received by the antenna.

13. The wearable device of claim 6, wherein the antenna is configured to communicate with a computing device on the user's body and the one or more processors are further configured to determine a switch state pattern of the switch units based on which side of the user's body the computing device is located.

14. The wearable device of claim 6, wherein the radiation characteristic of the antenna is a radiation directionality of the antenna.

15. A system comprising:
  a first wearable device and a second wearable device configured to be worn by a user, for each respective wearable device of the first wearable device and the second wearable device, the respective wearable device includes:
  a housing configured for wear at an ear of the user;
  a wireless transceiver contained within the housing;
  one or more processors implemented in circuitry; and
  an antenna contained within the housing, the antenna comprising:
    a plurality of elements, wherein the elements include a first antenna element, a second antenna element, and a strap element, each comprising an electrically conductive material, the first antenna element and the second antenna element are oriented substantially in opposition to one another, the strap element has a first portion that is connected to the first antenna element and a second portion that is connected to the second antenna element;
    one or more feed points configured for operable coupling to the wireless transceiver, wherein the one or more feed points include a first feed point on the first antenna element and a second feed point on the second antenna element, the first portion of the strap element is on an opposite side of the first antenna element from the first feed point, and the second portion of the strap element is on an opposite side of the second antenna element from the second feed point;
    a set of one or more switch units, wherein:
      the set of switch units includes a switch unit that connects the first portion of the strap element and the second portion of the strap element, and
      for each respective switch unit of the set of switch units:
        the respective switch unit is connected to one or more elements in the plurality of elements, and
        a flow of electrical current to the one or more elements connected to the respective switch unit is dependent on a switch state of the respective switch unit,
      wherein a radiation characteristic of the antenna is dependent on switch states of the switch units.

16. The system of claim 15, wherein physical structures of the antennas of the first and second wearable devices are the same and a switch state pattern of the switch units of the antenna of the first wearable device is different from a switch state pattern of the switch units of the antenna of the second wearable device.

* * * * *